United States Patent [19]

Fürst

[11] Patent Number: 4,647,106
[45] Date of Patent: Mar. 3, 1987

[54] LIFTING/SLIDING ROOF FOR VEHICLES
[75] Inventor: Arpad Fürst, Munich, Fed. Rep. of Germany
[73] Assignee: Webasto-Werk W. Baier GmbH & Co., Fed. Rep. of Germany
[21] Appl. No.: 707,762
[22] Filed: Mar. 4, 1985
[30] Foreign Application Priority Data
  Mar. 5, 1984 [DE] Fed. Rep. of Germany ....... 3408056
[51] Int. Cl.⁴ .................. B60J 7/057; B60J 7/047; B60J 7/19
[52] U.S. Cl. .................. 296/223; 296/216; 296/222; 296/224; 296/221
[58] Field of Search .............. 296/216, 221–222, 296/224, 223

[56] References Cited
U.S. PATENT DOCUMENTS
  4,364,601 12/1982 katayama et al. .......... 296/221

FOREIGN PATENT DOCUMENTS
  3129900  2/1983 Fed. Rep. of Germany ...... 296/222
  3311452 10/1983 Fed. Rep. of Germany ...... 296/222
   57515  5/1981 Japan .................. 296/221
  157619 12/1981 Japan .................. 296/222
  157620 12/1981 Japan .................. 296/222
   44527  3/1982 Japan .................. 296/221
   89223  5/1984 Japan .................. 296/216
   89224  5/1984 Japan .................. 296/216

Primary Examiner—Robert B. Reeves
Assistant Examiner—Dennis H. Pedder
Attorney, Agent, or Firm—Sixbey, Friedman & Leedom

[57] ABSTRACT

A lifting/sliding roof for vehicles having a cover for the selective closing and at least partial exposing of an opening in the roof. The cover, starting from its closed position, can be swung around a transverse axis located near its front end into a tilted-up position wherein its rear edge is lifted up, and can be, for selected embodiments, slid rearwardly either over or beneath the roof along guide rails, extending on both sides of the opening in the roof, into an open position. A catching device that is automatically adjustable as a function of the motion of the cover can be engaged with a counterbearing in the closed position of the cover for holding down the rear end of the cover. The counterbearing is attached at a stationary part of the roof. The catching device is mounted at the cover so as to be displaceable therewith, but it is also in permanent pivotal engagement with a driving rod member which, during swinging motion of the cover, in a raising as well as in a lowering direction, forces the catching device to carry out an additional movement with respect to the cover which, in the raising direction, assists the upward movement of the rear edge of the cover.

22 Claims, 13 Drawing Figures

LIFTING/SLIDING ROOF FOR VEHICLES

BACKGROUND AND SUMMARY OF THE INVENTION

This invention relates to a lifting/sliding roof for vehicles having a cover panel for the selective closing and at least partial exposing of an opening in the roof. By means of an operating mechanism, the cover panel of a roof of this type can, starting from a closed position, be swung around a transverse axis located at or near its front end into a tilted up position while its rear edge is lifted up. Also, this cover can be slid toward the rear, along guide rails extending on both sides of the roof opening, into an open position. This lifting/sliding roof also has a catching device that is automatically adjustable as a function of the adjusting motion of the cover and that, for holding down the rear end of the cover in the closed position of the cover, can be engaged with a counterbearing.

In the case of such a lifting/sliding roof, it is known (German Offenlegungsshrift No. 31 29 900) to fasten the counterbearing at the cover and to provide a catching lever as the catching device that is pivoted at the stationary guide rail. This catching lever, via a rod, is prestressed by means of a pull-back spring in a direction that corresponds to the tilting motion of the cover and the release of the counterbearing by the catching device. The rod actuating the catching lever, when the cover is swung into the closed position, via an engaging coupling, engages with the cover in order to engage the catching device against the resistance of the spring with the counterbearing. When the cover is tilted out, the engaging coupling releases the rod for a restoring movement under the influence of the prestressed pull-back spring. It is true that, in the case of this known roof, the catching device to a certain extent supports the tilting motion of the cover; however, this tilting support is furnished only by the pull-back spring, which is required to exert a relatively weak force. Because of the mutual engagement between the catching lever and the counterbearing taking place in the tilt-out phase via spring power, rattling noises may easily occur that are caused, for example, by the unevenness of the road. Furthermore, the stability of the operational parts of the roof is not good.

Also, in the case of another known lifting/sliding roof (German Offenlegungsshrift No. 33 11 452), the counterbearing is mounted at the cover, while the catching device is located in the area of the guide rail. It is true that in this case there is a forced taking-along of the catching device by the operating mechanism of the roof during the lifting-up as well as lowering of the rear edge of the cover. However, the catching device will engage with the counterbearing only after the cover has already reached its closed position. Vice versa, the catching device is disengaged from the counterbearing before the cover starts its tilt-out motion. The catching device, therefore, has no stabilizing influence on the cover in the critical swinging phase, and it can also not be utilized as a tilt-out support.

Therefore, the invention is based on the objective of creating a lifting/sliding roof of the initially mentioned type which has increased stability and an especially robust construction and where the cover, even at high speeds of the vehicle, is held securely in the closed position and can be tilted-out without problems and without rattling noises.

According to preferred embodiments of the invention, this objective is achieved by mounting the counterbearing at a stationary part of the roof, while the adjustable catching device is mounted at the cover and goes along with its motion, and by the fact that the catching device is in permanent engagement with a driving member which, during the swinging motion of the rear edge of the cover, in raising as well as in lowering movement, forces the catching device to carry out an additional movement with respect to the cover which, in the raising direction, supports the upward movement of the rear edge of the cover.

In the case of the solution according to the invention, the catching device not only holds the cover in a closed position in its rear area via a forced connection with the cover drive, but the catching device, also via a forced driving connection, supports the tilting-out of the cover as well. By means of the mounting of the adjustable catching device at the cover, the coupling problems can be avoided that occur in the case of the arrangement according to German Offenlegungsshrift No. 31 29 900. At the same time, the catching device, in contrast to the device according to German Offenlegungsshrift No. 33 11 452, may without difficulties be designed in such a way that, in interaction with the counterbearing (the rear edge of the cover), it transmits to (−) a forced movement over a relatively large swiveling range in both swinging directions of the cover.

Other developments embodied in the invention result in an especially robust construction requiring only a relatively small number of moved parts. Additionally, the rods of the catching device can be adapted especially well to existing geometric conditions and can themselves be guided securely. The use of link guides having a pair of mutually staggered slots and a link pin for each slot makes it possible to place the transverse axis around which the cover carries out its swinging motion at a desirable point and to provide a robust holding of the cover in its front area. Another development, whereby the transport carriages each carry a link pin that engages a longitudinally extending link slot of a cover support, permits a minimizing of the required joining points. However, naturally, it is also possible to attach the link pins at the cover support and to develop the link slots in the transport carriage.

By means of an automaticaly operating lock, the stability of the tilted-out cover is further increased in a simple way, and a spring, installed into the operating device so as to prestress the cover in a raising direction, results in a further support of the tilt-out movement of the cover. By means of a link guide, a guiding of the transport carriage is ensured that has little play and is secure with respect to tilting without impairing the useful width of the opening in the roof. By means of stop means, a cam and cam slot arrangement, undesirable sliding movements of the cover are avoided in a simple way, while the cover is swiveled.

The invention is suitable for roofs where the cover is pushed back over the fixed covering of the roof as well as for roofs where the opening of the roof takes place by a moving-back of the cover under the fixed part of the roof.

These and further objects, features and advantages of the present invention will become more obvious from the following description when taken in connection with the accompanying drawings which show, for purposes of illustration only, plural embodiments in accordance with the present invention.

DETAILED DESCRIPTION OF THE PREFERRED EMBODIMENTS

Figure 1:
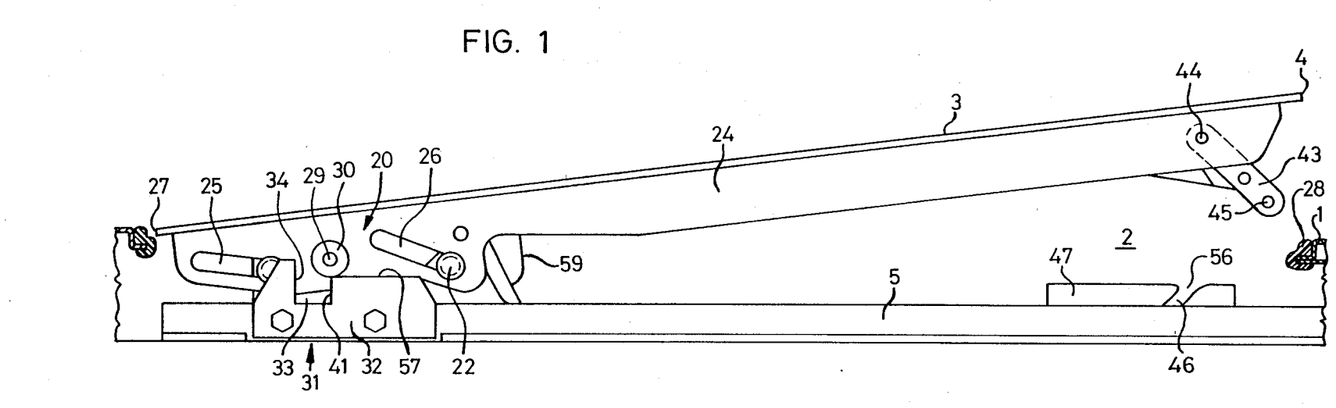
FIG. 1 is a lateral view of a lifting/sliding roof according to a first embodiment of the invention, when the cover is tilted out.
Figure 2:
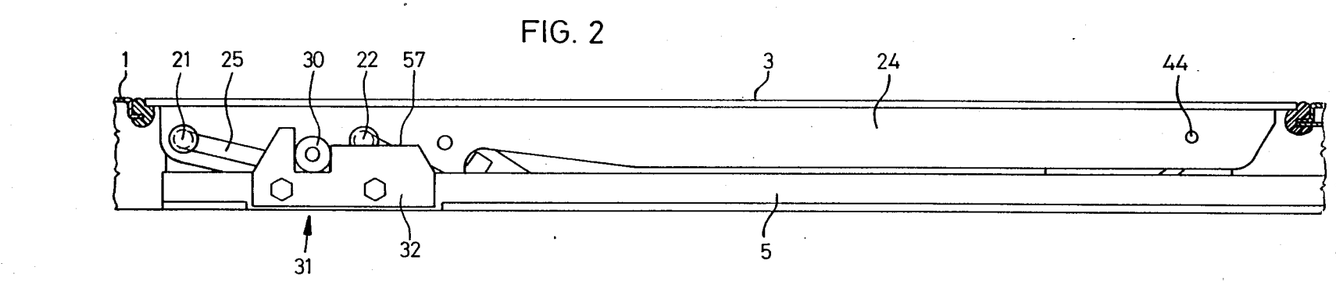
FIG. 2 is a view corresponding to FIG. 1 when the cover is in a closed position.
Figure 13:
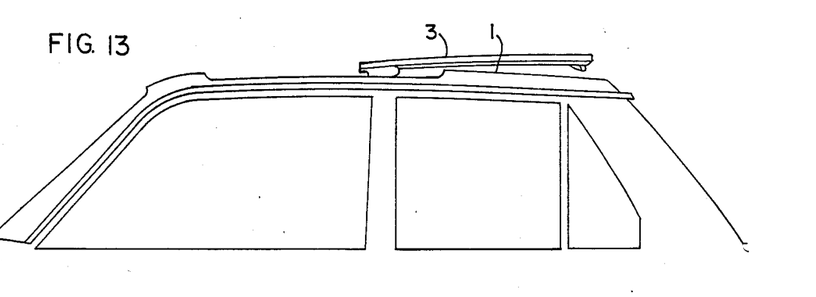
FIG. 13 is a diagrammatic side view showing the cover shifted rearwardly of the fixed part of the roof.

In the figures, 1 is the fixed part of a roof of a vehicle which has a rectangular opening 2 in it. The opening 2 in the roof can be closed by means of a cover 3 (FIGS. 2 and 4). The cover 3 can have its rear edge 4 tilted-out over the fixed part 1 of the roof (FIGS. 1, 3 and 5) in order to ventilate the interior of the vehicle. For exposing the opening 2 in the roof, the cover 3 may also be pushed backwards over the fixed part of the roof (FIG. 13).

At both sides of the opening in the roof 2, a guide rail 5 is located that extends in the longitudinal direction of the vehicle, said guide rail 5, from a point located close to the front edge of the opening 2 of the roof, extends toward the rear under the fixed part 1 of the roof. The guide rails which are located on both sides of the opening 2 in the roof, in a manner that is not shown in detail, may also be part of a frame. Of the guide rails, only the guide rail 5 which is on the left when facing the front of the vehicle (i.e., the front edge of opening 2 is on the left) is shown in the figures. The opposite right guide rail and the interacting operating parts of the roof are developed mirror-symmetrically with respect to the arrangement on the left side of the vehicle.

Figure 8:
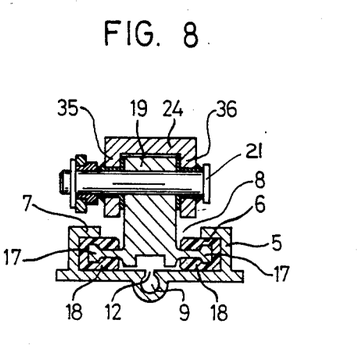
FIG. 8 is a sectional view along line VIII—VIII of FIG. 4.

As shown in FIG. 8, the guide rail 5 forms a guide channel 6 that is rectangular in its cross section, a longitudinal slot 8 being formed in its upper wall 7. A cable guiding duct 9 is located under the guide channel 6 for receiving a driving cable 10 (FIG. 5) which, preferably, is a pressure-resistant threaded cable and which, via a driving pinion (not shown), is in driving connection with a drive, such as an electric motor or a crank, such cable drives being known, per se. At the end of the driving cable 10 that is on the left in FIGS. 5 and 6, a carrier 11 is fastened that extends upwardly through a slot 12 in the separating wall between the guiding ducts 6, 9.

Figure 5:
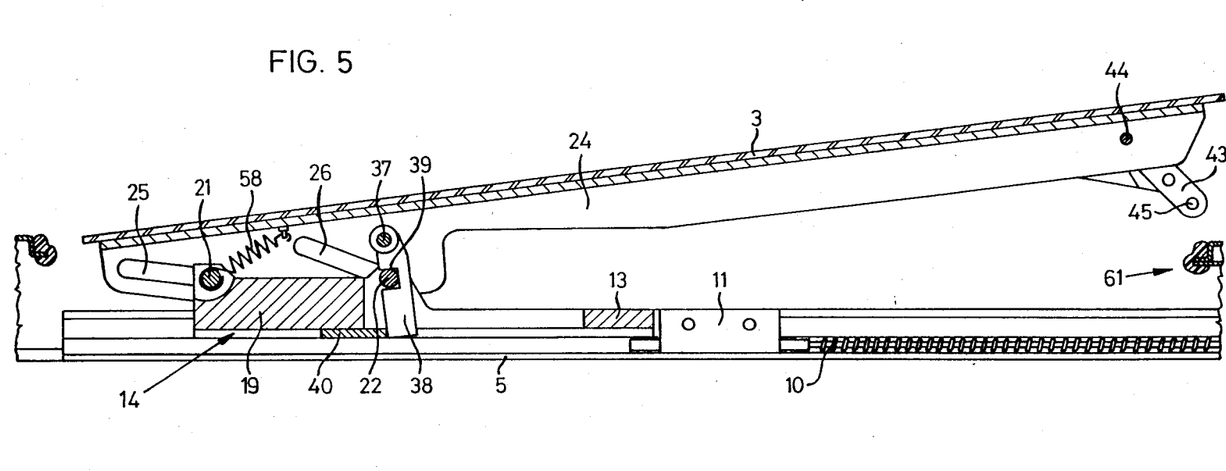
FIG. 5 is a sectional view along line V—V of FIG. 7 when the cover is tilted out.
Figure 6:
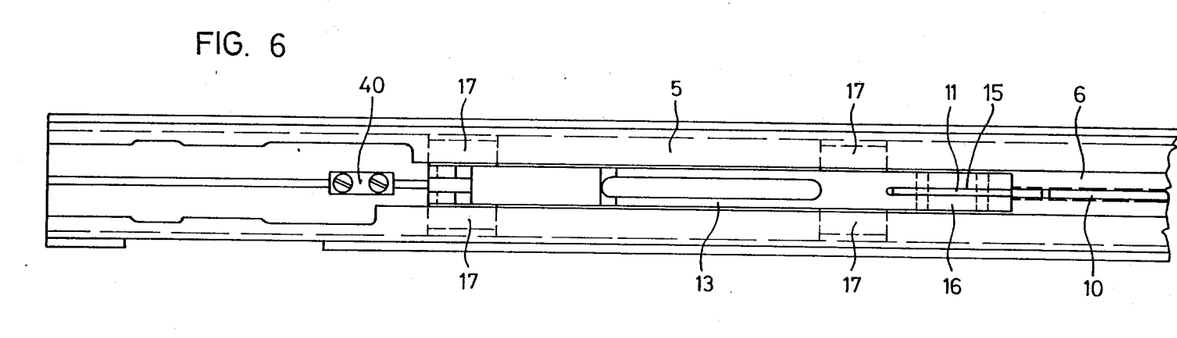
FIG. 6 is a top view of the guide rails of the sliding roof according to FIGS. 1 to 5 with the transport carriage in the guide rail.

The carrier means 11, itself, is connected with the end of a guiding section 13 of a transport carriage 14 that is on the right, i.e. in the rear, in FIGS. 5 and 6. It may, for example, be riveted. In this case, as shown in FIG. 6, the carrier means 11 extends into a longitudinal slot 15 of the fork-shaped end 16 of guiding section 13. Guiding section 13, near its front and rear ends, on both sides, has guide shoe supports 17 projecting transversely with respect to the longitudinal direction of the guide rail 5. A guide shoe 18 is located on each of the four guide shoe supports 17. The guide shoes 18 may be made of plastic and rest against the walls of the guide channel 6. The top surface of the carrier means 11 and of the guiding section 13 may, preferably, be flush with the top surface of the guide rail 5. The guiding section 13 of the transport carriage 14, in its front area, changes into an upwardly projecting link pin support 19, said link pin support 19 being part of a link guide that has the reference number 20 and at its upper front and rear ends, in each case, carries one link pin 21 and 22.

On both sides, the cover 3 is supported on a cover support 24 that has an inverted U-shaped cross section (FIG. 8). The cover supports 24 may be part of a frame or an inside plate of the cover. However, they may also be separate rail-type components. In the front area of the cover support 24, two link slots 25, 26 are formed that are displaced with respect to one another in the longitudinal direction of the guide rail 5, each one of the link pins 21, 22 of the transport carriage 14 engaging into a respective link slot 25, 26. The two link slots 25, 26 slope at different angles toward the back in such a way that a sliding motion of the transport carriage 14 along the guide rail 5, between positions that correspond to FIGS. 1 and 3 as well as 2 and 4, causes the cover 3 to carry out a swinging motion around an (imagined) transverse axis which coincides essentially with the front edge 27 of the cover. As a result, a dipping of the front edge 27 of the cover under the level of the fixed part 1 of the roof is avoided when the cover 3 is tilted out. This, among other things, is desirable in order to reliably avoid damage to a sealing means 28 extending all around the opening 2 in the roof.

A pin 29 projects transversely toward the outside from the cover support 24. A roller-shaped cam 30 is disposed on the pin 29, said cam 30 being part of a locking means which, as a whole, has the reference number 31. A cam plate 32 is also part of the locking means 31, said cam plate 32 being mounted near the front end of the guide rail 5 or being connected with it in one piece. The cam plate 32 has a cam slot 33 that is open on top and extends essentially vertically, the width of said cam slot 33 corresponding to the diameter of the cam 30. Between the legs 35, 36 of the part 24 of the frame of the cover that point downward, a lock lever 38 is suspended at a transverse pivot 37 (FIG. 5) which advantageously, in a way that is not shown in detail in FIG. 5, is elastically biased in a clockwise direction.

The lock lever 38 is provided with a recess 39 at its front edge into which the rear link pin 22 catches (FIG. 5) as soon as the cover 3, when its rear edge 4 is raised, reaches the fully tilted position. In this manner, when the cover 3 is tilted out, an interlocked connection is established between the cover 3 and the transport carriage 14. When the transport carriage 14, starting from the position according to FIG. 5, is displaced further to the front, the lock lever 38 is pivoted counterclockwise by means of the engagement of the lower end of the lock lever with a release means 40 that is fastened at the guide rail 5 and is disposed in the path of the movement of the transport carriage 14. As a result, the lock lever 38 disengages from its interlocked engagement with the link pin 22. The cover 3 is, thus, released for a swinging movement in closing direction.

Figure 7:
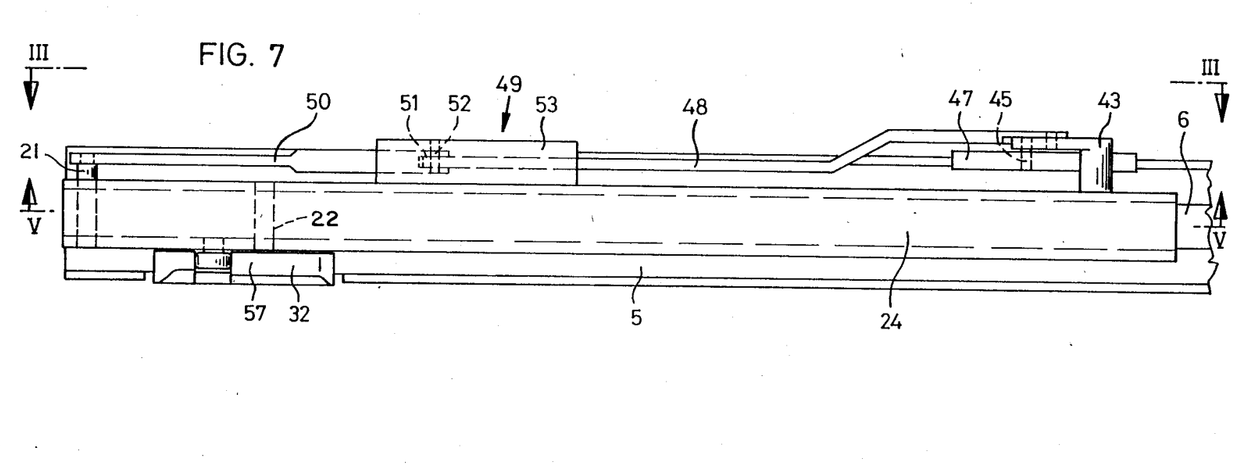
FIG. 7 is a top view of the left guide rail of the lifting/sliding roof according to FIGS. 1 to 6 with the catching device and the link guide, but without the cover.

A catching lever 43, that is part of an adjustable catching device 42 close to the rear end of the cover, is coupled to the cover support 24 so that it can be swung around a transverse pivot formed by a joint 44. The catching lever 43, at its end that is located away from the joint 44, carries a transversely projecting catching pivot 45 that can be engaged with a catching slot 46 of a counterbearing 47. The counterbearing 47 is fastened to the guide rail 5. It may also be integrally connected with it. At a center area of the catching lever 43, the rear end of a bent rod part 48 is coupled which is part of a multipart rod structure 49 of the catching device 42. A front rod part 50 is part of the rod structure 49, a fork-shaped rear end 51 (FIG. 7) of said rod part 50 being connected with the front end of the rod part 48 via a joint 52. A guiding part 53 having an inverted U-shaped cross section is attached laterally at the cover support 24. The outer leg 54 of the guiding part 53 has a guiding slot 55 extending in parallel to the cover 3. The joint pin forming the joint 52 engages in the guiding slot 55 with its outside end. The front end of rod part 50 is coupled at the front link pin 21. A tension spring 58 extends between the front link pin 21 and part 24 of the frame of the cover.

When the transport carriages 14 located at both sides of the opening in the roof, starting from the position shown in FIG. 5, are moved toward the front by means of the driving cables 10, the lock lever 38, by means of the release means 40, is swung around the pivot 37 in a counterclockwise direction. The lock lever 38 releases the link pin 22. The link guide 20 that had been locked until then is unlocked. When the transport carriage 14 is moved further forward, the cover is brought into its front end position which is limited by the fact that the cam 30 strikes against the front wall 34 of the cam slot 33. While the cover supports 24, together with the cover 3, are stopped from sliding, in this way, the link pins 21, 22 in the respective link slots 25, 26 move forward because of the continued movement of the transport carriage 14. As a result, the cover is forced to carry out a pivoting motion around a transverse axis which, in the case of the illustrated embodiment, essentially coincides with the front edge 27 of the cover 3 that is in its front end position. The rear edge 4 of the cover moves downward. The spring 58 is stretched. As a result, it stores potential energy released by the lowering of the cover.

Figure 3:
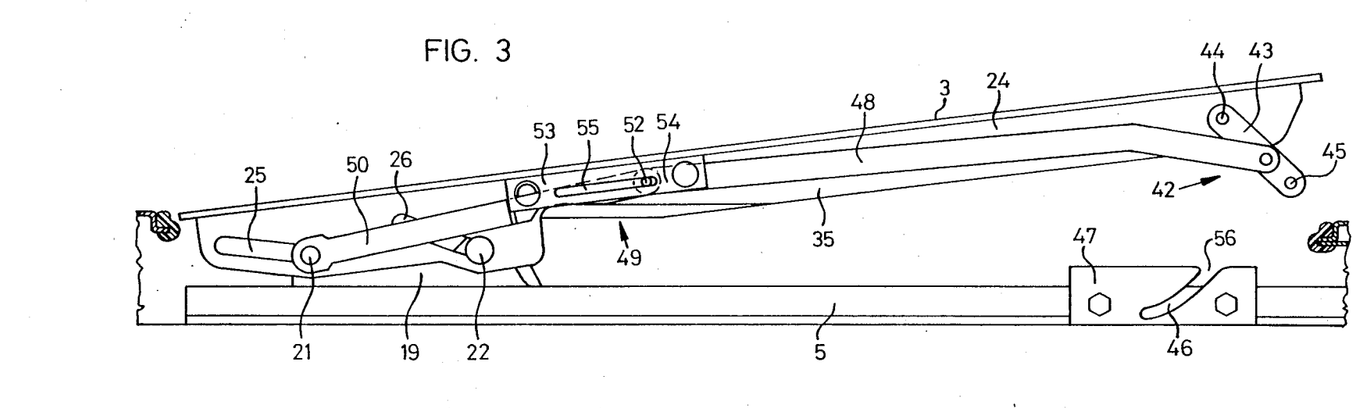
FIG. 3 is a sectional view of the sliding/lifting roof, when the cover is tilted out, viewed in the direction of the Arrows III—III of FIG. 7.
Figure 4:
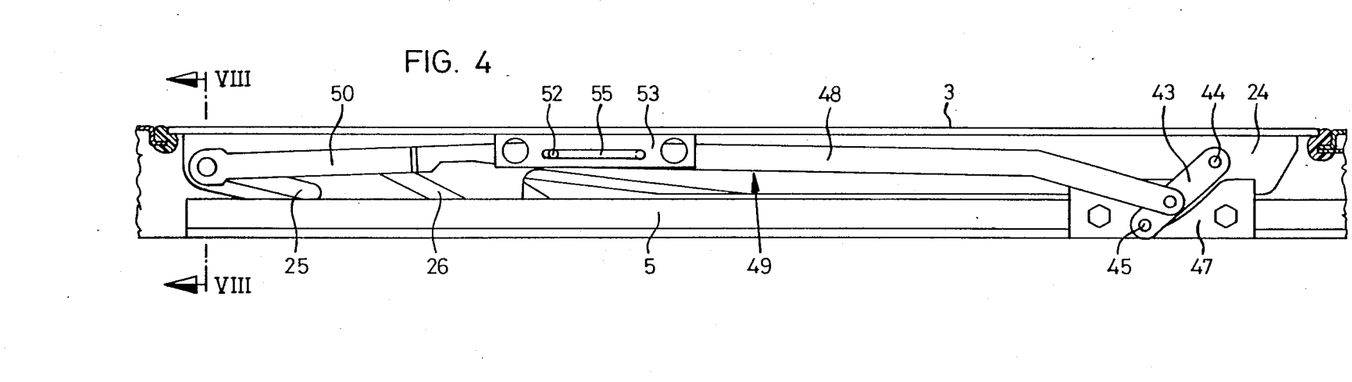
FIG. 4 is a sectional view corresponding to FIG. 3 when the cover is in a closed position.

When the cover 3 has arrived in its final front position, the rod structure 49, because of the continued forward movement of the transport carriage 14, is pulled forward by the link pin 21, the joint 52 moving forward in the guide slot 55 (FIGS. 3 and 4). Because of the relative movement between rod parts 48, 50 and the cover support 24, the rod structure 49 swings the catching lever 43 clockwise relative to the position shown in FIGS. 1, 3 and 5. Here, the arrangement in the case of the illustrated preferred embodiment is such that the longitudinal axis of the catching lever 43 is essentially vertical with respect to the longitudinal axis of the cover 3 when the catching pivot 45 reaches the open upper end 56 of the catching slot 46. By means of the dipping of the catching pivot 45 into the catching slot 46, the cover 3 is guided securely in the area of its rear end. When the cover 3 finally reaches the closed position shown in FIGS. 2 and 4, a force is exercised by the catching lever 43, on the rear area of the cover support 24, and thus also on the cover 3, which is directed diagonally forward and downward. As a result, upward movements of the cover are reliably avoided that may, for example, be caused by a vacuum occurring at the exterior side of the cover at high vehicle speeds. A pulling-up of the rear edge 4 of the cover from the outside during an attempted break-in or a snapping-open of the cover during an accident is also effectively prevented.

For the opening of the cover, starting from the closed position according to FIGS. 3 and 4, the transport carriages 14 are moved toward the rear along the guide rails 5. Because the cam 30 rests against the rear wall 41 of the cam slot 33, the cover support 24 and the cover 3 cannot move along in such a shifting motion. The link pins 21, 22 move toward the rear in the link slots 25, 26. As a result, the cover 3 is caused to carry out an upward tilting motion around its front edge 27. This tilting motion, at least in its first part, is significantly supported by the fact that the catching lever 43, because of the pivot connection between the transport carriage 14 and the catching lever 43, via the rod structure 49, is forced to carry out a swiveling motion in a counterclockwise direction (in FIGS. 2 and 4).

As a result, the catching lever 43, starting from the position that is directed diagonally forward and is taken up in the closed position of the cover 3, raises itself up to a position in which the longitudinal axis of the catching lever is finally essentially vertical with respect to the longitudinal axis of the cover, when the catching pivot 45 reaches the open end 56 of the catching slot 46. In this way, the cover drive, via the driving cables 10, the transport carriages 14, the rod structure 49 and the catching levers 43 located at both sides of the cover, transfers a power component that is directed upward on the rear part of the cover 3. Thus, an especially effective tilting-out support is ensured. During the explained swinging of the rear edge 4 of the cover in an upward direction, the spring 58 releases the energy it had stored. This also assists the tilting-out movement.

When the transport carriage 14, after the cover 3 has been tilted up into its final forward position, is moved further toward the rear, the cover 3 is taken along by the transport carriage because of the fact that the link pins 21, 22 place themselves against the rear ends of the link slots 25, 26. In the process, the release means 40 releases the lock lever 38 for a swiveling motion around the pivot 37 in a clockwise direction (in FIG. 5). The rear link pin 22 places itself in the recess 35 of the lock lever 38. This ensures an interlocked connection between the cover 3 and the transport carriage 14. This interlocked connection ensures a stable holding of the cover 3 in the tilted-out position. In the transition phase, in which the cover 3 has reached its final tilt-out position and therefore, the cam has come free of the rear wall 41 of the cam slot 33, but the lock lever 38 has not yet grasped the link pin 22, a support of the tilted-out cover takes place because of the fact that the cam 30 runs up onto a dwell section 57 of the cam plate 32. This dwell section 57 extends rearwardly from the wall 41.

When the cam 30 leaves the dwell 57, the lock lever 38 with its recess 39 has placed itself around the link pin 22.

The tilted-out cover 3, via the transport carriages 14, can be moved toward the rear until a wall 59 of the cover support 24, located near the rear end of the rear link slot 26, practically reaches the rear edge 61 of the opening 2 in the roof. In the case of the explained manner of construction, the length of the link guide 20, in the movement direction of the cover, can be kept relatively short, without impairing the stability of the cover guide. Consequently, the part of the total area of the opening 2 in the roof exposed when the cover 3 is pushed back, is relatively large. The guiding section 13 of the transport carriage that reaches beyond the link guide 20 toward the rear permits relatively large distances between the front and the rear guide shoe supports 17 and thus an especially exact guiding of the transport carriage. However, this does not take place at the expense of the exposable part of the opening in the roof because the guiding part 13, when the transport carriage 14 moves back, slides under the fixed part 1 of the roof rearwardly adjoining the edge 61.

Figure 9:
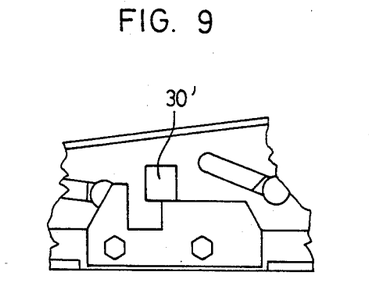
FIG. 9 is a partial view corresponding to FIG. 1 for a modified embodiment of the locking means.

In the case of the modified embodiment according to FIG. 9, the roller cam 30 is replaced by a cam 30' having a rectangular cross-section. This further improves the guiding of the cover 3 during its swiveling motion.

Figure 10:
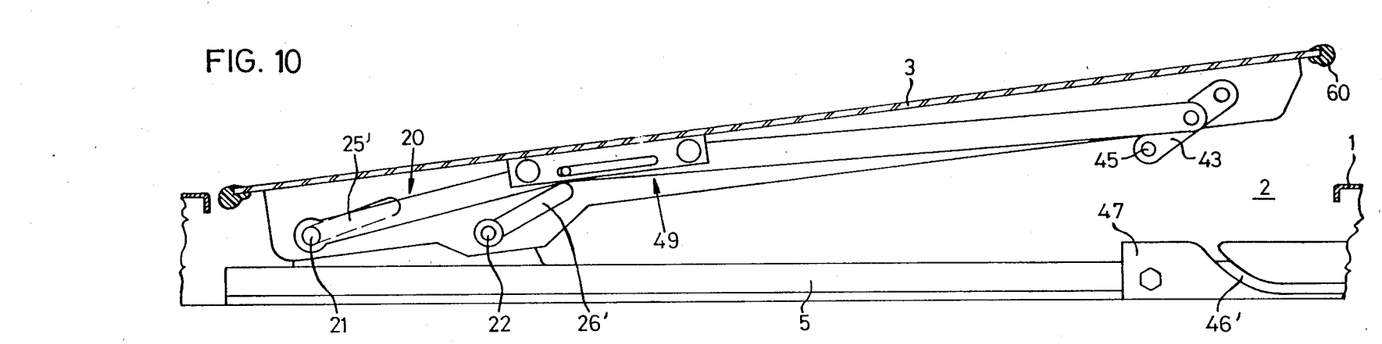
FIGS. 10, 11 and 12 are sectional views of a modified embodiment of a lifting/sliding roof having a cover that can be adjusted toward the rear under a fixed part of the roof.
Figure 11:
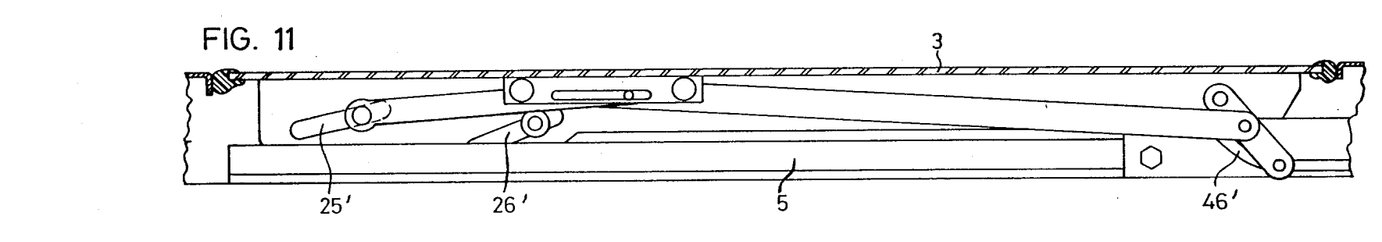
Figure 12:
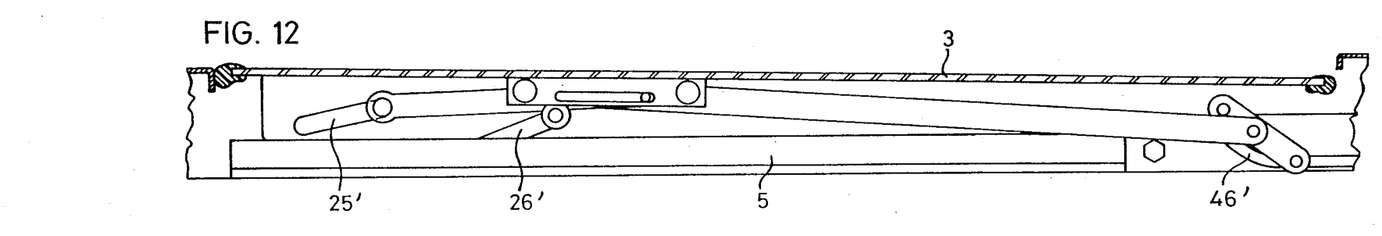

In contrast to the above-explained embodiments, where the cover 3 can be pushed back over the fixed part 1 of the roof, FIGS. 10, 11 and 12 show an embodiment where the cover 3 with its rear edge 4, starting from the tilted-out position according to FIG. 10, via the closed position according to FIG. 11, can be further lowered into the position shown in FIG. 12 and then can be pushed under the fixed part 1 of the roof in order to expose the opening 2 in the roof. In order to permit the lowering of the rear edge of the cover under the rear edge of the opening 2 in the roof, a sealing means 60 surrounding the edge of the cover 3 is provided instead of the sealing means 28. Corresponding to the changed sequence of operations, the link slots 25', 26' and the catching slot 46' are sloped in reversed direction. However, essentially, the structure and the function of the roof correspond to that of the previously explained embodiments and therefore require no further explanation.

While I have shown and described a single embodiment in accordance with the present invention, it is understood that the same is not limited thereto, but is susceptible of numerous changes and modifications as known to those skilled in the art, and I, therefore, do not wish to be limited to cover all such changes and modifications as are encompassed by the scope of the appended claims.

I claim:

1. A lifting/sliding roof for vehicles having a cover for selectively closing and at least partially exposing an opening in the roof; an operating mechanism serving as a means for enabling a rear end of the cover to be swung in a vertical direction relative to its front end from a closed position into a tilted-up position wherein a rear edge of the cover is lifted up, and for enabling said cover to be slid rearwardly along guide rails from said closed position into an open position; a catching device and a counterbearng, said catching device being automatically adjustable as a function of the motion of the cover and being engageable and disengageable with the counterbearing as a means for holding down the rear end of the cover in the closed position of the cover; wherein the counterbearing is fixedly mounted to a stationary part of the roof, while the adjustable catching device is mounted to the cover so as to be displaceable therewith; and a driving member comprising a rearwardly extending rod structure, wherein the catching device is in permanent relatively displaceable engagement with the rod structure of the driving member which, during the swinging motion of the cover, in a raising direction as well as in a lowering direction, constitutes a means for forcing the catching device to carry out movement with respect to the cover which, in the raising direction, assists the upward movement of the rear edge of the cover.

2. A lifting/sliding roof according to claim 1, wherein the catching device has a catching lever that is coupled to the cover near the rear edge of the cover and said rod structure pivots the catching lever as a function of the swinging movement of the cover.

3. A lifting/sliding roof according to claim 2, wherein the operating device has a transport carriage which is guided so that it can be slid along a respective guide rail, and wherein the transport carriage is connected with a front part of the cover via a link guide that forces the swinging motion of the cover by means of a limited shifting of the transport carriage in a longitudinal direction of the respective guide rail with respect to the cover.

4. A lifting/sliding roof according to claim 3, wherein the transport carriages also form a driving member for the catching device.

5. A lifting/sliding roof according to claim 4, wherein an end of the rod structure that is located away from the catching lever is coupled to a transport carriage.

6. A lifting/sliding roof according to claim 5, wherein the rod structure comprises two rod parts extending essentially in the longitudinal direction of the cover, ends of said rod parts that face one another being pivotally connected with one another.

7. A lifting/sliding roof according to claim 6, wherein the connection between the two rod parts is guided so that it can be slid longitudinally with respect to the cover.

8. A lifting/sliding roof according to claim 3, wherein the link guide has two link slots that are staggered with respect to one another in the longitudinal direction of the guide rail and two link pins each of which engages in a respective link slot.

9. A lifting/sliding roof according to claim 8, wherein the link pins are aligned in such a way that the swinging of the cover occurs essentially about the front edge of the cover.

10. A lifting/sliding roof according to claim 5, wherein the transport carriages each carry at least one link pin which engages into a link slot of a cover support extending in a longitudinal direction of the cover.

11. A lifting/sliding roof according to claim 10, wherein the end of the rod structure that is away from the catching lever is coupled to the link pin.

12. A lifting/sliding roof according to claim 10, wherein an automatically operating lock is provided for establishing an interconnection between the cover and the operating device when the cover is tilted out.

13. A lifting/sliding roof according to claim 12, wherein the lock has a lock lever for locking the link guide.

14. A lifting/sliding roof according to claim 13, wherein the lock lever is in hinged connection with the cover and, when the cover is tilted out, is locked with a link pin of the transport carriage.

15. A lifting/sliding roof according to claim 13, further comprising release means, located along the path of movement of the transport carriages, for unlocking of the lock lever in an area of movement of the transport carriages that occurs during the swinging motion of the cover.

16. A lifting/sliding roof according to claim 1, wherein a spring is installed into the operating device for applying a biasing force to the cover in the raising direction.

17. A lifting/sliding roof according to claim 3, wherein parts of the link guide are mounted to the transport carriages, said parts being located at a front end of the transport carriage, and each transport carriage has a guiding section that engages with the respective guide rail and extends rearwardly beyond the link guide.

18. A lifting/sliding roof according to claim 1, further comprising a stop means for preventing a forward shifting of the cover during the swinging movement thereof.

19. A lifting/sliding roof according to claim 18, wherein the cover, during the swinging motion, is also secured by means of the stop means with respect to rearward shifting thereof.

20. A lifting/sliding roof according to claim 19, wherein a cam is connected with the cover, said cam, during swinging motion of the cover, being held in a fixed cam slot that is essentially vertically oriented with respect to the sliding direction of the cover and is released from the cam slot when the cover has reached the tilted-out position.

21. A lifting/sliding roof according to claim 1, wherein the cover is rearwardly shiftable over a fixed part of the vehicle roof from said tilted-up position.

22. A lifting/sliding roof according to claim 1, wherein the cover is lowered at its rear end and received under a fixed part of the roof, during its rearward sliding movement, by said operating mechanism.

* * * * *